US008806209B2

(12) United States Patent
Hemphill et al.

(10) Patent No.: US 8,806,209 B2
(45) Date of Patent: Aug. 12, 2014

(54) PROVISIONING OF ELECTRONIC DEVICES

(71) Applicant: WigWag, LLC, Austin, TX (US)

(72) Inventors: Thomas E. Hemphill, Austin, TX (US); Jean-Marc Trinon, Liege (BE)

(73) Assignee: WigWag, LLC, Austin, TX (US)

( * ) Notice: Subject to any disclaimer, the term of this patent is extended or adjusted under 35 U.S.C. 154(b) by 37 days.

(21) Appl. No.: 13/726,052

(22) Filed: Dec. 22, 2012

(65) Prior Publication Data
US 2014/0181521 A1 Jun. 26, 2014

(51) Int. Cl.
H04L 29/06 (2006.01)

(52) U.S. Cl.
USPC ............... 713/171; 380/277; 709/220; 726/5

(58) Field of Classification Search
None
See application file for complete search history.

(56) References Cited

U.S. PATENT DOCUMENTS

| | | | |
|---|---|---|---|
| 4,728,949 A | 3/1988 | Platte | |
| 5,081,534 A | 1/1992 | Geiger | |
| 5,086,385 A | 2/1992 | Launey | |
| 5,510,975 A | 4/1996 | Ziegler | |
| 5,579,221 A | 11/1996 | Mun | |
| 5,621,662 A | 4/1997 | Humphries | |
| 5,905,442 A | 5/1999 | Mosebrook | |
| 5,982,103 A | 11/1999 | Mosebrook | |
| 6,198,479 B1 | 3/2001 | Humpleman | |
| 6,243,707 B1 | 6/2001 | Humpleman | |
| 6,288,716 B1 | 9/2001 | Humpleman | |
| 6,473,661 B1 | 10/2002 | Wollner | |
| 6,580,950 B1 | 6/2003 | Johnson | |
| 6,615,088 B1 | 9/2003 | Myer | |
| 6,792,319 B1 | 9/2004 | Bilger | |
| 6,876,889 B1 | 4/2005 | Lortz | |
| 6,901,439 B1* | 5/2005 | Bonasia et al. | 709/220 |
| 6,912,579 B2 | 6/2005 | Byrnes | |
| 6,950,725 B2 | 9/2005 | von Kannewurff | |
| 7,082,339 B2 | 7/2006 | Murray | |
| 7,136,709 B2 | 11/2006 | Arling | |
| 7,345,998 B2* | 3/2008 | Cregg et al. | 370/230 |
| 7,386,721 B1* | 6/2008 | Vilhuber et al. | 713/156 |
| 7,509,402 B2 | 3/2009 | Moorer | |
| 7,530,113 B2* | 5/2009 | Braun | 726/28 |
| 7,594,106 B2 | 9/2009 | Smith | |
| 7,685,263 B2* | 3/2010 | Redjaian et al. | 709/220 |
| 7,701,900 B2 | 4/2010 | Barnum | |
| 7,752,309 B2 | 7/2010 | Keyghobad | |
| 8,042,048 B2 | 10/2011 | Wilson | |
| 8,078,290 B2 | 12/2011 | Nelson | |
| 8,327,130 B2* | 12/2012 | Wilkinson | 713/155 |
| 2001/0034754 A1 | 10/2001 | Elwahab | |
| 2003/0040812 A1 | 2/2003 | Gonzales | |
| 2003/0074088 A1 | 4/2003 | Gonzales | |
| 2004/0255023 A1* | 12/2004 | Motoyama et al. | 709/224 |

(Continued)

Primary Examiner — Fikremariam A Yalew
(74) Attorney, Agent, or Firm — Fogarty, L.L.C.; Luiz von Paumgartten

(57) ABSTRACT

Systems and methods for provisioning electronic devices. In some embodiments, a method may include receiving a first message at a provisioning server, the first message originated by a computing device, the first message including a device identifier associated with an automation device. The method may also include receiving a second message at the provisioning server, the second message originated by the automation device and including at least a device identifier portion. In response to the device identifier portion of the second message matching the device identifier of the first message and/or in response to the automation device not being associated with a provisioning account, the method may then include providing configuration information to the automation device.

19 Claims, 6 Drawing Sheets

(56) References Cited

U.S. PATENT DOCUMENTS

| | | |
|---|---|---|
| 2005/0177254 A1 | 8/2005 | Yoon |
| 2011/0054710 A1 | 3/2011 | Imes |
| 2011/0110521 A1* | 5/2011 | Yang et al. .................... 380/270 |
| 2011/0196755 A1* | 8/2011 | Landa ............................ 705/23 |
| 2012/0188052 A1 | 7/2012 | Rosenblatt |
| 2013/0010965 A1* | 1/2013 | Falk .............................. 380/277 |
| 2014/0052855 A1* | 2/2014 | Motoyama et al. ........... 709/224 |

* cited by examiner

PROVISIONING OF ELECTRONIC DEVICES

FIELD

This disclosure relates generally to the field of electronics, and more specifically, to systems and methods for provisioning electronic devices.

BACKGROUND

In today's highly interconnected world, the process of adding a device to a network (herein referred to as "provisioning") in a secure manner invariably involves a relatively large amount of user interaction. Normally, a user has to manipulate an interface on the device in order to configure it to join the network. It is often through the device's own interface that the user provides information as to which network the device should join, what type of security protocol to use, etc.

Consider, for instance, the addition of a computer to a WiFi network. To configure the computer, a user provides the computer with information regarding the Service Set Identification (SSID) or "name" of the network, as well as any other authentication information needed. Similarly, when adding an automation device (e.g., a sensor, controller, etc.) to an X10 network, the user sets an "address" for the device, so that the network may manage it correctly. In both provisioning scenarios, the efforts involved in the authentication and configuration of the device rest on the shoulders of the end-user, who must have a sophisticated understanding of the network and its operation.

SUMMARY

Embodiments of systems and methods for provisioning electronic devices are described herein. In an illustrative, non-limiting embodiment, a method may include receiving a first message at a provisioning server, the first message originated by a computing device, the first message including a device identifier associated with an automation device. The method may also include receiving a second message at the provisioning server, the second message originated by the automation device and including at least a device identifier portion. In response to the device identifier portion of the second message matching the device identifier of the first message and/or in response to the automation device not being associated with a provisioning account, the method may further include providing configuration information to the automation device.

For example, the automation device may include at least one of: a lighting control device, a thermostat device, a shading device, a security device, an appliance, or an entertainment device. Meanwhile, the computer device may include at least one of: a mobile phone, a tablet computer, a laptop computer, or a desktop computer. Also, the first message may be originated in response to the computing device having received the device identifier via at least one of: a text entry, a bar code, a two-dimensional code, a Quick Response (QR) code, a Radio Frequency Identification (RFID) tag, a Near Field Communication (NFC) chip, or a Personal Area Network (PAN) communication.

The first message may be received at the provisioning server while the automation device is powered off, and the second message may be received at the provisioning server after the first message has been received.

In some implementations, providing the configuration information may include providing the configuration in response to a difference between a time of the second message and a time of the first message being within a threshold value. Additionally or alternatively, providing the configuration information may include providing the configuration in response to a network part of an Internet Protocol (IP) address of the second message matching a network part of an IP address of the first message. Additionally or alternatively, providing the configuration information may include providing the configuration in response to the physical location of the computing device being within a predefined geographical region where the automation device is allowed to be deployed.

The provisioning server may have access to a database configured to store a plurality of device identifiers and corresponding private-public key pairs, each device identifier and corresponding private-public key pair associated with a given automation device, wherein the device identifier portion of the second message is encrypted using a public key, the public key stored in the automation device during manufacturing of the automation device. As such, the method may further include decrypting at least the device identifier portion of the second message into a decrypted device identifier using a private key corresponding to the public key, and, in response to the decrypted device identifier matching the device identifier of the first message, transmitting the private key to the automation device by the provisioning server, the automation device configured to use the private key in a subsequent communication.

In cases where the first message may be encrypted by the computing device independently of the public key, the method may also include decrypting the first message by the provisioning server to obtain the device identifier.

In another illustrative, non-limiting embodiment, an automation device may include a memory configured to store a device identifier and a public key and a processing circuit coupled to the memory. The processing circuit may be configured to execute instructions to cause the automation device to transmit a first communication to a remotely located provisioning service, the request including the device identifier encrypted using the public key, the first communication transmitted after a message originated by a computing device is received by the provisioning service, the message including the device identifier, the provisioning service having access to a database configured to store a plurality of device identifiers and corresponding private-public key pairs, each device identifier and corresponding private-public key pair associated with an automation device. The processing circuit may also be configured to execute instructions to cause the automation device to receive a second communication from the provisioning service, the second communication including a private key corresponding to the public key, the private key identified by the provisioning service among the plurality of private-public key pairs based upon one or more attempts to decrypt the first communication using other private keys, the second communication received in response to the encrypted device identifier of the first communication matching the device identifier of the message. In some situations, the message may be received by the provisioning server while the automation device is powered off, and it may be encrypted independently of the public key.

In some embodiments, the private key may be identified by the provisioning service among a subset of the plurality of private-public key pairs, the subset of the plurality of private-public key pairs selected based upon a difference between a time of the first communication and a time of the message. Additionally or alternatively, the private key may be identified by the provisioning service among a subset of the plurality of private-public key pairs, the subset of the plurality of private-public key pairs selected based upon a relationship between an IP address of the first communication and an IP address of the message.

Moreover, the second communication may be received in response to a determination that the IP address of the computing device is not within a network where the automation device is prohibited from being deployed. Additionally or alternatively, the second communication may be received in response to a determination that the physical location of the computing device is not outside of geographical region where the automation device is prohibited from being deployed.

In another illustrative, non-limiting embodiment, a non-transitory computer-readable storage medium may have program instructions stored thereon that, upon execution by a processor within a computing device, cause the computing device to obtain a device identifier associated with an automation device and transmit a first message to a provisioning server, the first message including the device identifier, the provisioning server having access to a database configured to store a plurality of device identifiers and corresponding private-public key pairs, each device identifier and corresponding private-public key pair associated with a different automation device, the provisioning server configured to receive a second message at the provisioning server originated by the automation device, the second message including at least the device identifier encrypted using a public key, the public key stored in the automation device during manufacturing of the automation device, the provisioning service configured to decrypt the device identifier of the second message into a decrypted device identifier using a private key corresponding to the public key, the provisioning service configured to, in response to the decrypted device identifier matching the device identifier of the first message, transmit the private key to the automation device, the automation device configured to use the private key in a subsequent communication.

To obtain the device identifier, the program instructions, upon execution, may cause the computing device to perform at least one of: (a) scan a graphical code or text associated with the automation device, or (b) read an electromagnetic signal produced by a tag or chip associated with the automation device. Additionally or alternatively, to obtain the device identifier, the program instructions, upon execution, may cause the computing device to obtain authentication information from a user authorized to provision the automation device.

The program instructions, upon execution, may cause the computing device to include an IP address of the computing device within the first message, the provisioning service configured to transmit the private key to the automation device in response to the IP address belonging to a network where the automation device is allowed to be deployed. Additionally or alternatively, the program instructions, upon execution, may cause the computing device to include Global Positioning Satellite (GPS) coordinates of the computing device within the first message, the provisioning service configured to transmit the private key to the automation device in response to the GPS coordinates being within a geographic region where the automation device is allowed to be deployed.

In various implementations, one or more of the techniques described herein may be performed by one or more computing systems or electronic devices. For example, an electronic device may include a processor and a memory, the memory configured to store program instructions executable by the processor to perform one or more operations disclosed herein. In other embodiments, a non-transitory computer-readable storage medium may have program instructions stored thereon that, upon execution by one or more computing systems or electronic devices, cause the computing systems or electronic devices to perform one or more operations disclosed herein.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
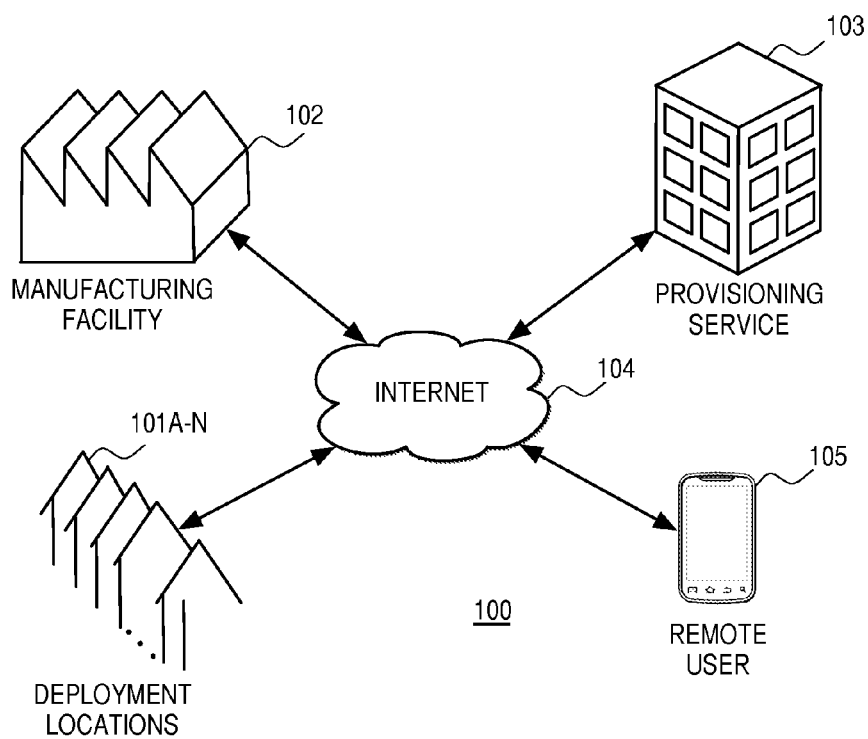
FIG. 1 is a diagram of an example of an environment where certain systems and methods described herein may be employed, according to some embodiments.

Embodiments disclosed herein are directed to systems and methods for securely provisioning electronic devices. In many implementations, these systems and methods may be particularly well suited for use with automation devices (e.g., sensors, controllers, etc.) used, for example, in lighting systems, power control systems, Heating, Ventilation, and Air Conditioning (HVAC) systems, thermostats, security systems (e.g., cameras, motion detectors, locks, etc.), garage doors, water systems (e.g., sprinklers, filtration, pumps, etc.), or the like. In other implementations, the systems and methods described herein may be applicable to sensor networks, wireless sensor networks, military sensor networks, environmental sensor networks, traffic sensor networks, surveillance sensor networks, or the like. In yet other implementations, certain aspects of these systems and methods may be implemented in the provisioning of other types of electronic devices, such as, for example, computer systems or Information Technology (IT) products (e.g., servers, desktops, laptops, switches, routers, etc.), telecommunications hardware, consumer devices or appliances (e.g., mobile phones, tablets, televisions, cameras, sound systems, etc.), scientific instrumentation, industrial robotics or automation devices, medical or laboratory electronics (e.g., imaging, diagnostic, or therapeutic equipment, etc.), etc.

In some implementations, the systems and methods described herein may enable the provisioning, creation, and/or management of groups of automation devices operating on top of conventional network services (e.g., wired, WiFi, WiMax, 3G, 4G, LTE, etc.), whether those network services are secured or not. Communications supporting interactions among automation devices operating in a given group may take place through a remote, centralized service or cloud-based service (referred to as a provisioning service 103) and/or via local gateway devices (referred to as relay devices 202)

connected to the cloud-based service. In some cases, a local gateway device may be deployed or provisioned as part of an account (e.g., a provisioning account) using the same techniques described for automation devices.

In some embodiments, an automation device may become fully operational only after its been provisioned to a particular account. Specifically, such an automation device may leave the factory without having been assigned to any account. Once the automation device establishes communications with the cloud-based service (either directly or through a gateway) and receives certain instructions/configuration items, it may then configure itself to become fully capable of communicating with the cloud-based service and/or user-owned gateway devices.

In some cases, for example, an automation device may become part of an account only when an identified user (i.e., a user logged into the cloud-based service using an application or through a web page) provides a device identification (referred to as Device ID) it may obtain from the automation device itself, or from the packaging/documentation that came with the device. Once the cloud-based service has both a user's request to provision a particular automation device (provided the device is not yet provisioned) and the automation device is itself communicating to get its assignment, then the cloud-based service may assign the automation device to the user, and may take action to enable operational communications between automation device and cloud-based service and/or between the automation device and user-owned gateways.

In some embodiments, enabling operational communications may be as simple as providing to an automation device a list of gateways that the automation device is allowed to communicate with and/or providing to a gateway device a list of automation devices that the gateway device may communicate with. In other embodiments, however, enabling operational communications may be more complex and, for example, may include providing to both gateway devices and automation devices encryption keys to allow secured communications. In some cases, to promote additional security, communications between gateway devices and the cloud-based service, and/or communications between automation devices and the cloud-based service (direct or through a gateway device) can be encrypted as well.

In other embodiments, a gateway device may be configured to simply relay, as pass-through, the communications of unknown automation devices to the cloud-based service. In a more secure mode, however, the gateway device may be unable to decipher communications originating from unknown automation devices. Once gateway device devices are assigned to the same account to which a given gateway device belongs, then the gateway device may obtain all it needs to establish full communications between itself and the automation devices.

In some cases, an "account" or "provisioning account" may be an individual user's account. In other cases, however, an "account" may be designed for a group of users; such each user may have different privileges, for example, with respect to the provisioning of automation devices. In yet other cases, a same user or group of users may have access to two or more different accounts (e.g., device installers, support personnel, etc.).

To facilitate explanation of the various systems and methods discussed herein, the following description has been split into sections. In the "Environment" section, environments where certain systems and methods described herein may be employed or deployed are described. In the "Deployment" section, deployment locations where automation devices may be provisioned are shown. The "Hardware" section illustrates examples of electronic devices and computer systems that may implement certain hardware elements discussed herein. Then, in the "Provisioning" section, methods of provisioning automation devices and examples of information exchanged among different devices are illustrated. It should be noted, however, that these sections and headings used are for organizational purposes only, and should not be used to limit or otherwise modify the scope of the description or the claims.

I. Environment

Turning to FIG. 1, a diagram of an example of environment 100 where certain systems and methods described herein may be employed is depicted according to some embodiments. As illustrated, one or more automation devices (shown in FIG. 2) may be produced or manufactured at factory or manufacturing facility 102. Once the automation device(s) leave facility 102 (e.g., sold through a retail channel, distributed to an end-user, etc.), they may be deployed at location(s) 101A-N. Examples of location(s) 101A-N include, but are not limited to, homes, offices, restaurants, retail stores, buildings, entertainment venues, etc.

In some cases, the provisioning process by which an automation device may be added to a local network within one of location(s) 101A-N may begin upon the device's deployment at the location(s) 101A-N. In other cases, as described in more detail below, certain operation(s) may take place prior to the device having left factory 102. During the provisioning process of these automation device(s), provisioning service or server 103 may perform one or more provisioning operations. In some embodiments, after the provisioning is completed, remote user 105 may control one or more aspects of the automation device(s) from any geographical location, for example, using a portable computing device (e.g., a mobile phone, tablet computer, etc.).

To enable certain secure provisioning techniques described herein, factory 102, location(s) 101A-N, provisioning service 103, and/or remote user 105 may be configured to communicate with one another, for example, over Internet 104. Although labeled as "Internet," in some cases element 104 may be replaced with and/or it may otherwise include any other suitable type of network (or combinations of different networks), such as, for example, a Public Switched Telephone Network (PSTN), cellular networks (e.g., 3G, 4G, LTE, etc.), Personal Communication Services (PCS) networks, cable transmission systems, satellite communication systems, electrically conductive transmission lines, fiber optic links, Local Area Networks (LANs), Metropolitan Area Networks (MANs), Wide Area Networks (WANs), intranets, extranets, etc.

II. Deployment

Figure 2:
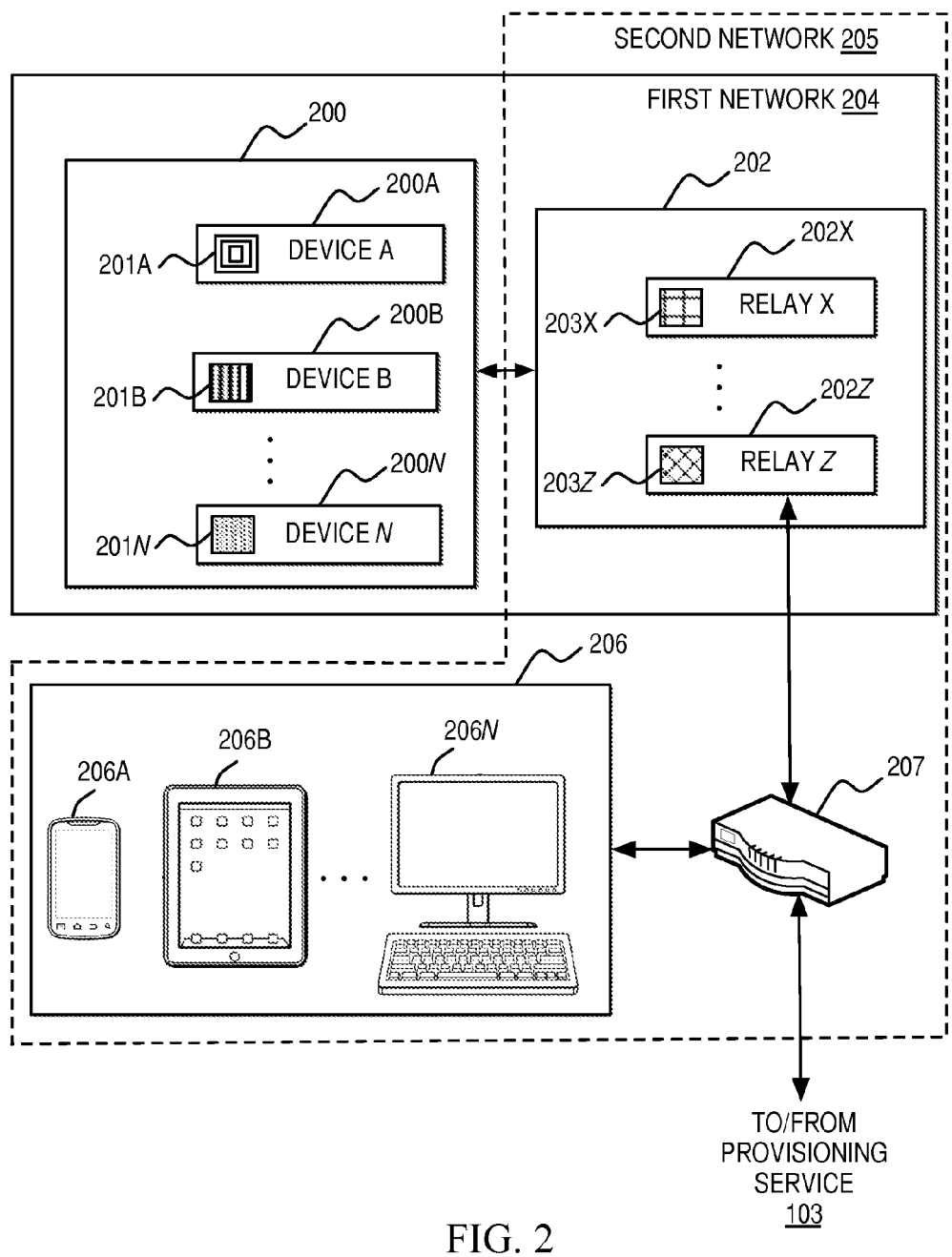
FIG. 2 is a diagram of an example of a deployment location where automation devices may be provisioned, according to some embodiments.

FIG. 2 is a diagram of an example of deployment location 101A where automation device(s) 200 may be provisioned according to some embodiments. As shown, one or more automation devices 200A-N and one or more relay devices 202X-Z may be disposed within or near deployment location 101A. Computing device(s) 206A-N may be operated by a user to at least partially enable the provisioning of automation device(s) 200 at location 101A through access point 207. In this example, automation devices 200A-N are configured to communicate over first network 204 using a first network protocol, whereas computing device(s) 206A-N and access point 207 are configured to communicate over second network 205 using a second network protocol.

In some cases, first network 204 may include a low-powered wireless network such as, for example, a 6lowPAN network, a ZIGBEE network, a DASH7 network, a BLUETOOTH network, or the like. In contrast, second network 205 may include high-powered wireless network, such as an IEEE 802.11 network (WiFi), a WiMAX network, a cellular network (e.g., LTE, etc.) or the like. In other embodiments, however, first and second networks 204 and 205 may include any suitable wired or wireless network.

For sake of illustration, consider that automation device 200A may be an intelligent light switch, automation device 200B may be a programmable HVAC thermostat, automation device 200N may be a smart appliance (e.g., dishwasher, television set, etc.), and so on. More generally, automation devices 200A-N may include any device or electronic circuitry capable of transmitting and receiving information over a network upon the successful completion of a provisioning operation. Relay device(s) 202X-Z may include a controller device configured to operate as gateway(s) to allow messages to and/or from automation device(s) 200A-N to reach access point 207, and therefore Internet 104. In other words, relay device(s) 202X-Z may act as an interface between first network 204 and second network 205. It should be noted, however, that, in some implementations, automation devices 200A-N may be configured to communicate directly over second network 205, in which case relay device(s) 202X-Z may be absent.

Each of automation device(s) 200A-N may include a corresponding Device Identifier 201A-N (Device ID). Moreover, each of relay device(s) 202X-Z, when present, may include its own Device ID 203X-Z. Because implementation of Device IDs 203X-Z is similar to the implementation of Device IDs 201A-N, the remainder of this document focuses on Device IDs 201A-N, but it should be noted that the similar techniques involved in the provisioning of automation device(s) 200A-N may be used to provision relay device(s) 202X-Z.

In some implementations, each of Device IDs 201A-N may be a globally unique alphanumeric string or the like that identifies a corresponding one of automation devices 200A-N. For example, Device ID(s) 201A-N may be provided in the form of a bar code, two-dimensional code, Quick Response (QR) code, Radio Frequency Identification (RFID) tag, Near Field Communication (NFC) chip, etc. More generally, Device ID(s) 201A-N may be provided in any form suitable for acquisition by a user and/or computing device 206. For instance, Device ID(s) 201A-N may be communicated to other devices such as computing device(s) 206 via a Personal Area Network (PAN) using BLUETOOTH or other suitable protocol. In some situations, Device ID(s) 201A-N may be physically provided, digitally stored, and/or imprinted upon the actual automation device. In other cases, Device IDs 201A-N may be provided on a box, packaging, instructions, or other materials accompanying automation device(s) 200A-N.

In some cases, Device ID(s) 201A-N may be assigned to each corresponding one of automation device(s) 200A-N (and/or relay device(s) 202X-Z, when present) prior to, during, or upon the automation device(s) 200A-N's manufacturing. As described in more detail below, a private-public key pair may also be generated for each Device ID(s) 201A-N. For example, a given automation device 200's Device ID 201 may be stored along with the public key portion of the corresponding private-public key pair in a memory within device. Meanwhile, the triplet Device ID 201, private key, and public key may be stored in a database maintained by or otherwise accessible to provisioning service 103.

Computing device(s) 206 may include mobile phone 206A, tablet computer 206B, desktop computer 206N, laptop computer (not shown), etc. Generally speaking, computing device(s) 206 may be any device capable of interrogating one or more types of Device ID(s) 201A-N (or to receive manual input from the user, for example, via a web browser or other software application) and to transmit the identifier information to provisioning service 103 over Internet 104. To this end, in some cases, computing device(s) 206 may include a camera, scanner, RFID reader, or NFC sensor. Additionally or alternatively, computing device(s) 206 may include a Global Positioning Satellite chip or circuitry configured to resolve or otherwise obtain or approximate a physical or geographic location (e.g., latitude and longitude) of computing device(s) 206.

Access point 207 may include any gateway, switch, modem, or router that enable communications to and from computing device(s) 206 (and/or relay device(s) 202X-Z, when present) over Internet 104.

It should be emphasized that the diagram of FIG. 2 is provided for sake of illustration only. In certain deployments, a single automation device 200 may be provisioned. In other deployments, a single relay device 202 may be provisioned. In some situations, three or more different types of networks may co-exist in the same location 101A, and two or more relay devices 202 may operate to enable communications across the different networks. In other situations, a single network may be provided; in which case relay device(s) 202 may be absent (or may be present nonetheless). In some cases, two or more of relay device(s) 202, access point 207, and/or computing device(s) 206 may be combined into a single component. In other words, numerous variations to the environment shown in FIG. 2 are contemplated and will be apparent to a person of ordinary skill in the art in light of this disclosure.

III. Hardware

Figure 3:
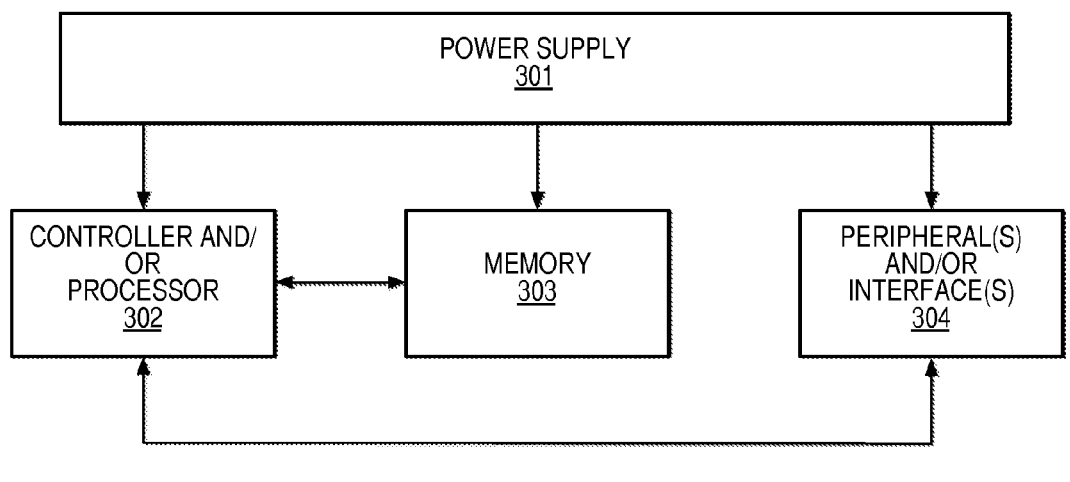
FIG. 3 is a block diagram of an example of an electronic device that may implement an automation device and/or a relay device, according to some embodiments.

FIG. 3 is a block diagram of an example of electronic device 300 that may implement one of automation device(s) 200 and/or one of relay device(s) 202. In some embodiments, device 300 may be designed as or it may otherwise include an Integrated Circuit (IC), Application Specific Integrated Circuit (ASIC), System-on-Chip (SoC), etc. As illustrated, device 300 includes processor and/or controller circuitry 302, memory circuitry 303, and peripheral and/or interface circuitry 304. Power supply circuitry 301 may be configured to provide analog and/or digital voltage levels to each of components 302-304. In some cases, a single automation device 200 and/or relay device 202 may include a single instance of device 300. In other cases, however, a single automation device 200 and/or relay device 202 may include two or more instances of device 300.

Processor and/or controller circuitry 302 may include any suitable type of controller device, such as, for example, an ARM architecture-based processor or microcontroller, a POWERPC architecture-based processor or microcontroller, etc. Memory circuitry 303 may include any suitable type of memory. For example, memory circuitry 303 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, etc. Memory circuitry 303 may also include one or more memory modules to which the memory devices are mounted, such as single inline memory modules (SIMMs), dual inline memory modules (DIMMs), etc. In some implementations, memory circuitry 303 may be configured to store information such as a public key, Device ID, etc.

Peripheral(s) and/or interface(s) 304 may include any desired circuitry, depending on the type of automation device 200 where device 300 resides. For example, in some implementations, automation device 200 may include a transducer or sensor, and peripheral(s) 304 may include circuitry suitable to interface controller 302 with such a sensor. In other implementations, automation device 200 may include an electromagnetic component or actuator, and peripheral(s) 304 may include circuitry suitable to interface controller 302 with such an actuator. Additionally or alternatively, peripheral(s) and/or interface(s) 304 may include devices configured to perform one or more types of wireless communication, such as Wi-Fi, 6lowPAN, ZIGBEE, DASH7, BLUETOOTH, cellular, GPS, etc.

In some embodiments, the modules or blocks shown in FIG. 3 may represent processing circuitry and/or sets of software routines, logic functions, and/or data structures that, when executed by the processing circuitry, perform specified operations. Although these modules are shown as distinct logical blocks, in other embodiments at least some of the operations performed by these modules may be combined in to fewer blocks. For example, in some cases, memory circuitry 303 may be combined with controller or processor 302. Conversely, memory circuitry 303 may be implemented as two or more components. Although shown with a particular configuration, in other embodiments these various modules or blocks may be rearranged in other suitable ways.

Figure 4:
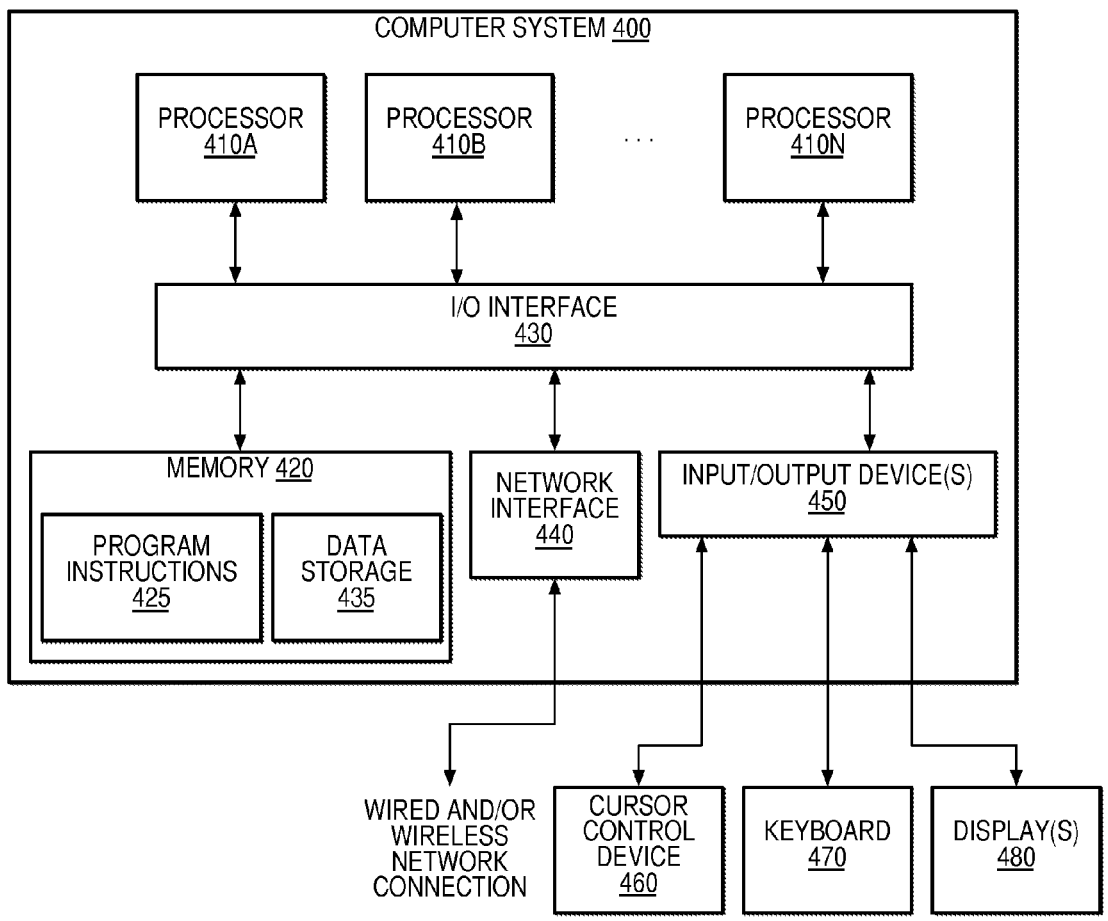
FIG. 4 is a block diagram of an example of a computer system that may implement a provisioning server or service, according to some embodiments.

As previously noted, aspects of network provisioning service 103 of FIG. 1 may be implemented or executed by one or more computer systems. Moreover, each of computing device(s) 207 shown in FIG. 2 may also be implemented as computer system. Hence, an example of a computer system is illustrated in FIG. 4. In various embodiments, computer system 400 may be a server, a mainframe computer system, a workstation, a network computer, a desktop computer, a laptop, or the like.

As illustrated, computer system 400 includes one or more processors 410A-N coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In some embodiments, a given entity (e.g., provisioning service 103) may be implemented using a single instance of computer system 400, while in other embodiments multiple such systems, or multiple nodes making up computer system 400, may be configured to host different portions or instances of embodiments.

In various embodiments, computer system 400 may be a single-processor system including one processor 410A, or a multi-processor system including two or more processors 410A-N (e.g., two, four, eight, or another suitable number). Processor(s) 410A-N may be any processor capable of executing program instructions. For example, in various embodiments, processor(s) 410A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 410A-N may commonly, but not necessarily, implement the same ISA. Also, in some embodiments, at least one processor(s) 410A-N may be a graphics processing unit (GPU) or other dedicated graphics-rendering device.

System memory 420 may be configured to store program instructions and/or data accessible by processor(s) 410A-N. For example, memory 420 may be used to store a provisioning database or the like. In various embodiments, system memory 420 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described herein, may be stored within system memory 420 as program instructions 425 and data storage 435, respectively. In other embodiments, program instructions and/or data may be received, sent or stored upon different types of computer-accessible media or on similar media separate from system memory 420 or computer system 400. Generally speaking, a computer-accessible medium may include any tangible, non-transitory storage media or memory media such as magnetic or optical media— e.g., disk or CD/DVD-ROM coupled to computer system 400 via I/O interface 430.

The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor(s) 410A-N). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. In addition, in some embodiments some or all of the functionality of I/O interface 430, such as an interface to system memory 420, may be incorporated directly into processor(s) 410A-N.

Network interface 440 may be configured to allow data to be exchanged between computer system 400 and other devices attached to network 104, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 450 may, in some embodiments, include one or more display terminals, keyboards, keypads, touch screens, scanning devices, voice or optical recognition devices, or any other devices suitable for entering or retrieving data by one or more computer system 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

As shown in FIG. 4, memory 420 may include program instructions 425, configured to implement certain embodiments described herein, and data storage 435, comprising various data accessible by program instructions 425. In an embodiment, program instructions 425 may include software elements of embodiments illustrated in FIG. 2. For example, program instructions 425 may be implemented in various embodiments using any desired programming language, scripting language, or combination of programming languages and/or scripting languages (e.g., C, C++, C#, JAVA®, JAVASCRIPT®, PERL®, etc.). Data storage 435 may include data that may be used in these embodiments. In other embodiments, other or different software elements and data may be included.

A person of ordinary skill in the art will appreciate that computer system 400 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

IV. Provisioning

In various embodiments, the provisioning systems and methods described herein may enable some or all of the intelligence required to securely provision automation device(s) 206 (and/or relay device(s) 202) to be shifted to computing device(s) 206 and/or provisioning service 103, and therefore away from an end-user. In some cases, if relay device(s) 202 are involved, they may be able to look for new automation device(s) 200A-200N even though they may not be authenticated and provisioned.

In general, the provisioning techniques discussed herein may make the process for adding an automation device 200 to a network (e.g., first network 204) become simple for the end user or installer. For example, a user may simply let provisioning service 103 know that automation device 200 will come online in the future. As such, automation device 200 does not need to be powered on or at all enabled during certain initial operations. For example, the user may obtain the Device ID 201A-N or unique identifier of the automation device 200. Such an identifier may be globally unique to that corresponding automation device 200 (i.e., different from any other automation device 200 which provisioning service 103 may deal with).

When obtaining Device ID 201A-N though computing device 206, the end user may enter it through a web page or other suitable manner, such as via scanning a bar code, QR code, reading an RFID tag, etc. Device ID 201A-N may then be sent to provisioning service 103. Provisioning service 103 may also identify the user with a pre-established account through a software application running on computing device 206 (e.g., a smartphone, etc.). When creating or maintain his or her account with provisioning service 103, the user may provide, for example, his or her network's SSID, protected password (e.g., for WEP/WPA/WPA2), and/or other configuration information that provisioning service 103 may then use to automatically configure automation device(s) 200 without further user involvement. In some cases, provisioning service 103 may also be informed of the user's location, which can also be used to verify authenticity of the provisioning request.

Once provisioning service 103 knows that automation device 200 will be online (and/or where it will be deployed due to information associated with the user), and once the device knows the identify of the user who is asking for it to be provisioned, provisioning service 103 may, through the use of appropriate public-key encryption, be highly certain automation device 200 belongs to an end user, belongs on the network (e.g., first network 204) to which its being added, and/or it is otherwise suitable for provisioning.

Automation device 200 may then be physically installed, for example, at location 101A, and it may eventually start communicating on a given wireless channel, using a predetermined protocol. Relay device(s) 202, when present, may be configured to listen for this initial communication. Once relay device(s) 202 detect the initial communication, they may contact provisioning service 103. Provisioning service 103 may send a message to relay device(s) 202 indicating whether to accept the automation device 200, based upon one or more authentication procedure(s) security check(s). If automation device 200 is accepted by provisioning service 103, provisioning service 103 may tell automation device 200 and/or relay device(s) 202 how to configure themselves, and then add them to the user's network 204 and/or 205.

Figure 5:
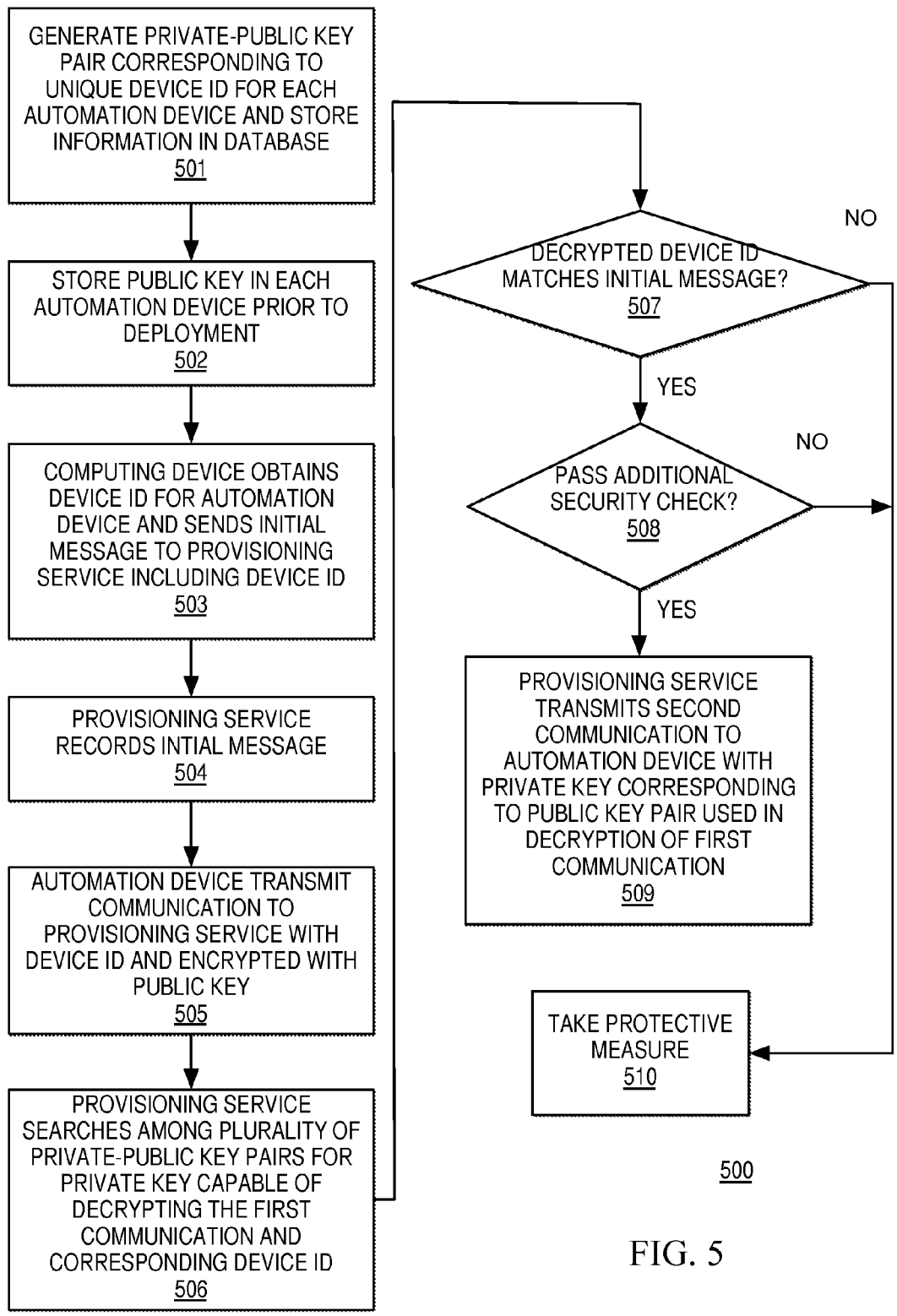
FIG. 5 is a flowchart of an example of a method of provisioning an automation device, according to some embodiments.

Turning now to FIG. 5, a flowchart of an example of method 500 of provisioning automation device 200 is depicted according to some embodiments. As shown, block 501 may take place at some point in time before automation device 200 is manufactured, deployed, or placed into the field, retail, or distribution. Particularly, at block 501, a public-private key pair may be produced and associated with a Device ID corresponding to automation device 200. Such a key pair may be generated using a variety of openly available or proprietary methods. For example, a suitable private-public key pair may be generated using an RSA LABORATORIES' Public-Key Cryptography Standards (PKCS) algorithm. Generally speaking, a public-private key pair may include two large numbers generated from two large prime numbers. The public key portion may be used to decrypt a message encrypted with the private key, and the private key may be used to decrypt a message encrypted with the public key.

Still at block 501, once generated, a combination of Device ID, Private Key, and Public Key may be stored in a "provisioning database" managed by or otherwise accessible to provisioning service 103, for example, as shown in Table I that follows:

TABLE I

| | Device ID | Private Key | Public Key | Parameter X | ... | Parameter Z |
|---|---|---|---|---|---|---|
| Device 202A | AAAAAA | 123456 | 654321 | ... | ... | ... |
| Device 202B | BBBBBB | 456789 | 987654 | ... | ... | ... |
| ... | ... | ... | ... | ... | ... | ... |
| Device 202N | NNNNNN | 123789 | 987123 | ... | ... | ... |

At block 502, and still before automation device 200 is placed into the field, retail, or distribution to an end-user (e.g., during manufacturing), the public key for that device may be placed, programmed into firmware, or otherwise semi-permanently or permanently placed onto automation device 200 along with the Device ID. The private key, however, may be withheld from automation device 200 and maintained in the provisioning database.

Again, the private key generally does not leave the provisioning database, and may be looked up by provisioning service 103 using Device ID 201A-N and/or other methods. In other words, the public key can be considered to be "publicly available," whereas the private key is generally maintained as a secret known only to provisioning service 103.

When automation device 200 finally makes its way to a user of provisioning service 103, be it through a retail sale, distribution through some organization, etc., automation device 200 is already ready to be provisioned into the user's network. In some cases, the user may have an individual or group account with provisioning service 103, and may therefore be considered to be "trusted" by service 103. Normally, the user has the expectation that automation device 200 will only be able to be controlled and monitored through his or her own account and/or other accounts the user allows to access the device. In other words, this user now controls who can access and/or use automation device 200.

Accordingly, at block 503, the user may inform provisioning service 103 that they now have possession of automation device 200. The technique selected to inform provisioning service 103 may authenticate the fact that the user does truly have automation device 200. Generally, the user may obtain a Device ID from automation device 200 via computing device 206, and it may transmit an initial message containing that particular Device ID to provisioning service 103. Normally, the initial message does not include the public key, and it may be independently encrypted via a connection through the user's computing device 206 with provisioning service 103. As previously noted, computing device 206 may obtain the Device ID by imaging a bar code, manually receiving a typed string, scanning an RFID tag, etc.

Still at block 503, the initial message is sent securely (encrypted) from the user's account to provisioning service 103. The initial message may originate from computing device 206 in the form of a trusted communication. In other words, provisioning server 103 may be able to determine the identity of the user based upon the initial message, which may have been confirmed (e.g., through password, certificate, etc.). In some cases, the initial message may also include the user's location, such as obtained through a GPS receiver within computing device 206.

At block 504, provisioning service 103 may receive and record the initial message transmitted via the user's account through computing device 206. Provisioning service 103 may store, in the provisioning database, the fact that the initial message was received, the time of receipt, the source Internet Protocol (IP) address of computing device 206 used to transmit the initial message, the user's account, etc. In some cases, when the initial message includes GPS coordinates of computing device 206, provisioning service 103 may also store that information in the provisioning database. These, and/or other data, may be stored as one or more of parameter(s) X-Z shown in Table I.

It should be noted that, up to this point, automation device 200 does not need to have communications with provisioning service 103, or even be turned on. In fact, up until the operations of block 504 have taken place, automation device 200 may still be dormant without power at all.

At block 505, automation device 200 may be turned on at location 101A or otherwise enabled. Then, automation device 200 may automatically attempt to communicate with provisioning service 103 either directly or via relay device(s) 202, if present. If a relay device 202 exists, it may also be associated with particular user's account as well. Thus, when using relay device 202, provisioning service 103 may require automation device 200 to send its first communication through one or more of relay device(s) 202 that is associated with the same account as automation device 200 being provisioned.

The first communication transmitted by automation device 200 to provisioning service 103 may be encrypted with the device's public key, and it may include the device's Device ID (as previously programmed into device 200 at block 502). The first communication may also include additional information. For example, in cases where automation device 200 has its own GPS receiver, the location of automation device 200 may be included in the first communication. In some implementations, if a predetermined timeout period has elapsed and automation device 200 is not yet in communication with provisioning service 103, the user may be required to send another message containing the device's Device ID to provisioning service 103 via computing device 206. For example, the user may be informed of the timeout's expiration through his or her account with provisioning service 103.

At block 506, provisioning service 103 may receive the first communication from automation device 200. Because the first communication is encrypted with the device's public key, however, provisioning service may not know which automation device(s) 200 has transmitted the communication and/or which private key may be used to decrypt that communication. Thus, in some embodiments, provisioning service 103 may search within its provisioning database for a private key that is able to successfully decrypt the first communication; that is, a private key that matches the public key stored in device 200.

To facilitate its search, provisioning service 103 may employ one or more techniques that narrow down the number of possible matching private keys. For example, the location from where the trusted user sent the initial message is generally the same as where automation device 200 is located at provisioning. This may be determined via a variety of methods including GPS, source IP address, cellular phone triangulation, etc. Additionally or alternatively, automation device 200 may generally come online in a time period close to when the user sent the message to provisioning service 103, for example, based on a threshold value. Additionally or alternatively, the first communication may include a non-encrypted version or portion of the Device ID to assist provisioning service 103 in finding the matching private key.

More generally, however, provisioning service 103 may attempt to decode the first communication of automation device 200 with a variety of stored key pairs until it finds the correct matching private key. The correct key pair or provision database entry will have a private key that is capable of decoding that communication.

Here it should be noted that, in alternative embodiments, provisioning service 103 may receive the first communication from automation device 200 prior to the initial message having been sent, for example, from computing device 206 to provisioning service 103. In other words, the operation(s) of block 505 may take place prior to the operation(s) of block 503. In those cases, provisioning service 103 may store the first communication from automation device 200 until it receives the initial message from computing device 206.

At block 507, the decoded communication may be examined to allow provisioning service to extract its Device ID, and, if the decrypted Device ID matches the Device ID corresponding the provisioning database entry where the matching private key was found, it may further validate the communication.

In some cases, additional security checks may be performed at block 508. For example, GPS coordinates included in the first communication may be checked against a preselected geographic region where automation device 200 is allowed to be deployed as a form of "geo-fencing." In other cases, a network portion of an IP address of the first communication may be checked against a network portion of an IP address of the second communication to determine whether computing device 206 and automation device 200 are in the same network. Additionally or alternatively, an IP address of the first communication may be checked against a preselected network where automation device 200 is allowed to be deployed.

If the decrypted Device ID does not match the Device ID stored in the provisioning database, or if additional security checks fail, then provisioning service 103 may take one or more protective measures at block 510. For example, provisioning service 103 may instruct relay device(s) 202 to block automation device 200 from accessing the network, a notification may be sent to a user that an unauthorized provisioning procedure was initiated, etc.

Otherwise, at block 509, provisioning service 103 may transmit a second communication to automation device 200. As with previous communications, if a relay device 202 is involved, it may forward this second communication to the automation device 200 being provisioned. In some implementations, the second communication may contain information for automation device 200 to complete setup and/or provisioning. For example, the second communication may include configuration information such as network SSID, protected access passwords, etc. The second communication may also include data that allows automation device 200 to lock itself to this specific user account. For example, the second communication may include a copy of the matching private key and/or an indication that automation device 200 has been associated with the provisioning account. In some implementations, the second communication may take place only if automation device 200 has not yet been associated with the user's provisioning account.

Additionally or alternatively, if secure communications to provisioning service 103 and to any relay device 202 is used, the second communication may be transmitted with symmetric encryption, such as, for example, an Advanced Encryption Standard (AES) encryption key. Provisioning service 103 may also send this key to relay device 202 (e.g., over an existing secure channel) so that they may communicate more securely.

Still at block 509, automation device 200 may now decrypt the second message using its public key. At this point, automation device 200 may be considered to have been successfully provisioned. Automation device 200 may also use the AES symmetric key (or other suitable encryption protocol for symmetric encryption), if one is sent, for secure communications with relay device(s) 202 and/or provisioning service 103.

In some embodiments, after automation device 200 is successfully provisioned, provisioning service 103 may generate an interface custom designed for that particular device. For example, a graphical interface may be accessible by the user (or other authorized persons) to allow the user to control aspects of automation device 200. For instance, a local user operating computing device(s) 206 or remote user 105 may access provisioning service 103 to turn automation device 200 on or off via Internet 104. Similarly, these users may be notified of activities performed or sensed by automation device 200 through the same interface as automation device 200 communicates with computing device(s) 206, relay device(s) 202, and/or provisioning service 103.

Additionally or alternatively, upon successfully provisioning automation device 200, provisioning service 103 may provide, to portions of code executing remotely (e.g., in the "cloud") within the context of the user account configuration, information that enables automation device 200 to communicate with other devices and/or provisioning service 103. Additionally or alternatively, configuration information may be provided or made available to relay devices 202 associated with the same provisioning account.

Figure 6:
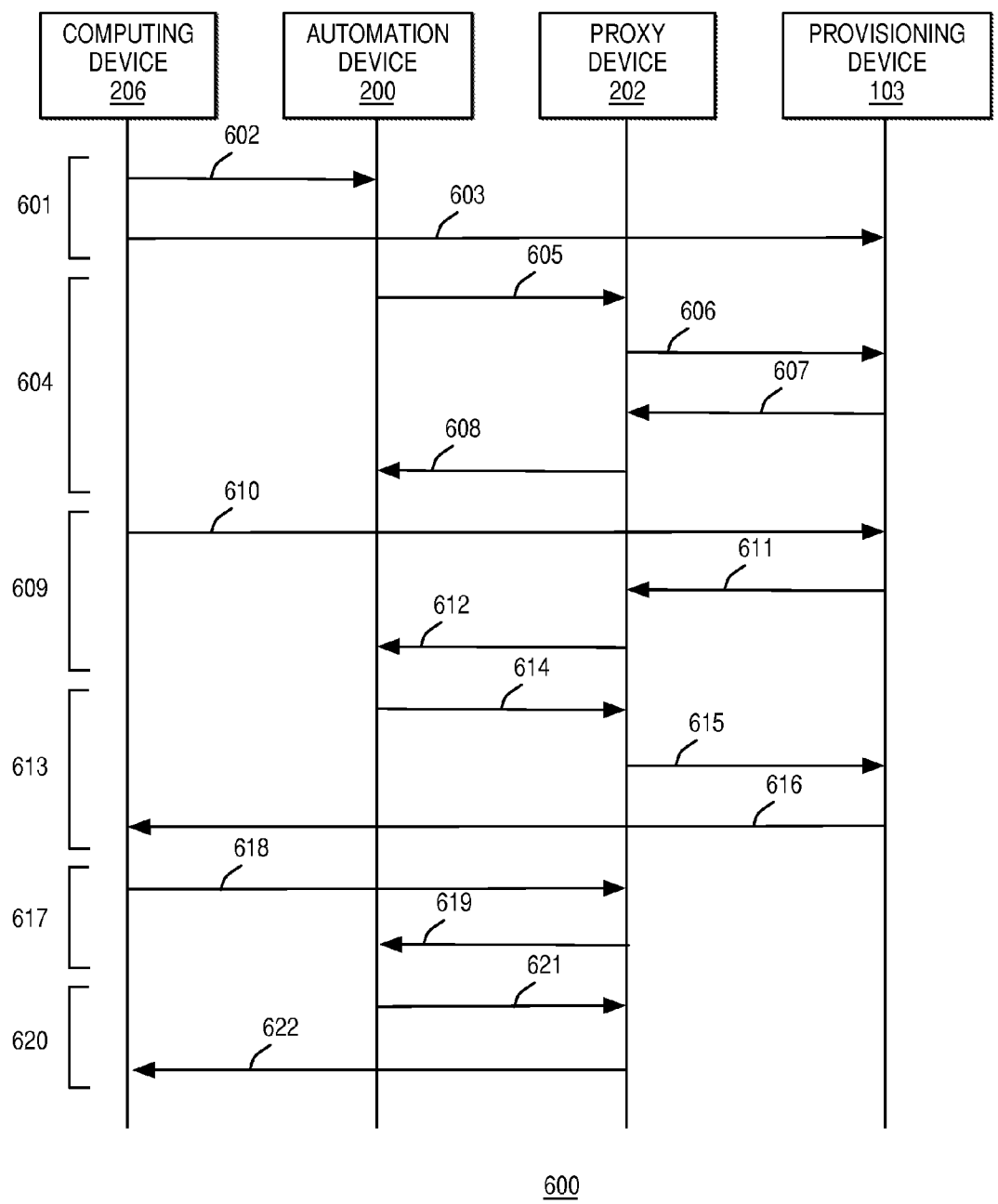
FIG. 6 is a diagram illustrating an example of information exchanged among an automation device, a computing device, a relay device, and/or a provisioning service, according to some embodiments.

FIG. 6 further illustrates an example of information exchanged among automation device 200, computing device 206, relay device 202, and/or provisioning service 103, according to some embodiments. As illustrated, message set 601 correspond to blocks 503 and 504 of FIG. 5. Particularly, message 602 shows computing device 206 obtaining the Device ID of automation device 200 (e.g., by taking a picture of a serial number, scanning a bar code, interrogating an RFID or NFC device, etc.), while message 603 shows computing device 206 transmitting the initial message to provisioning service 103. In some embodiments, message 603 may be encrypted independently of a previously generated private-public key pair for automation device 200.

Message set 604 correspond to blocks 505-509 of FIG. 5. Specifically, message 605 shows the first communication originated by automation device 206 to relay device 202 (if present), message 606 shows the first communication forwarded from relay device 202 to provisioning service 103, message 607 shows the second communication originated by provisioning service 103 to relay device 202 (if present), and message 608 shows the second communication forwarded from relay device 202 to automation device 200. In some embodiments, the first communication (messages 605 and/or 606) may be encrypted with the public key embedded into automation device 200, and it may contain the Device ID of that device. The second communication (messages 607 and/or 608) may also be encrypted with the public key, private key, or a symmetric encryption key.

Message sets 609 and 613 illustrate a procedure through which a user operating computing device 206 may interact with automation device 200 via provisioning service 103 after the automation device 200's initial provisioning, for example, using a graphic user interface or the like. Particularly, computing device 206 may transmit request 610 to provisioning service 103, which then sends command 611 to relay device 202 (if present), and which then forward command 612 to automation device 200. If the request requires an acknowledgement or response, for example, automation device 200 may transmit such a response 614 to relay device 202 (if present), which forwards response 615 to provisioning service 103, and which then communicates result 616 to computing device 206. It should be noted that in cases when automation device 200 initiates its own request, however, the direction of individual messages in message sets 609 and/or 613 may be reversed.

Message sets 617 and 620 show a procedure through which a user operating computing device 206 may interact with automation device 200 without accessing provisioning service 103. Specifically, computing device 206 may transmit request 618 to relay device 202 (if present), which then forwards request 619 to automation device 200. If the request requires an acknowledgement or response, for example, automation device 200 may transmit such a response 621 to relay device 202 (if present), which then forwards response 622 to computing device 206. Similarly as above, here it should also be noted that, in cases when automation device 200 initiates its own request, the direction of individual messages in message sets 617 and/or 620 may be reversed.

It should be understood that the various operations described herein, particularly in connection with FIGS. 5 and 6, may be implemented in software executed by processing circuitry, hardware, or a combination thereof. The order in which each operation of a given method is performed may be changed, and various elements of the systems illustrated herein may be added, reordered, combined, omitted, modified, etc. It is intended that the invention(s) described herein embrace all such modifications and changes and, accordingly, the above description should be regarded in an illustrative rather than a restrictive sense.

It should be noted that aspects of the provisioning techniques discussed above present numerous benefits in comparison to conventional provisioning processes where some type of physical access or direct manipulation of an automation device is needed. For example, from the perspective of the user installing the device, the process only involves telling provisioning service 103 that automation device 200 exists at their location. No manual manipulation of the device, either physically, or through software is generally required. In fact, in some cases, automation device 200 does not even need to be powered during the initial part of the process described herein. And, because the provisioning process is much simpler and virtually no manual work is required of the user, the process is much faster.

Again, using the techniques discussed herein, an end-user generally does not need to learn much information about automation device 200, other than how to physically install it (e.g., plug it in) and how to obtain its Device ID using computing device 206. Automation device 200 does not need to be told anything about the network it is joining by the end-user, and hence the end-user does not need to know the network's configuration. These methods also provide significant security, important in wireless networks where physical access is not required to join. Moreover, the process for what information is sent and what a device does at provisioning time can change over time, without always requiring a new type of device to be built or its firmware changed.

Consequently, these techniques may allow large amounts of automation devices 200 to be quickly and securely deployed at a given location or system. For example, if dozens or hundreds of sensors may be deployed or scattered across a particular location, a user may simply wave their RFID enabled smartphone at a box of sensors upon their arrival, automatically acquiring all the Device IDs for all the sensors in the bucket and then allowing provisioning service 103 to provision all of them securely.

More generally, these techniques enable the secure mass deployment of many devices at one or more locations. Provisioning service 103 may ensure that all communication after provisioning is secure, since a symmetric key for symmetric encryption may later be passed to automation devices 200, and to relay device(s) 202 if required. Further, these techniques enable untrained and/or unskilled workers to install intelligent devices during normal building or house construction and renovation. Sensor networks may be quickly and securely installed, and new types of automation devices may be deployed that would not necessarily require new training in procedures to add the device to the network. Upon provisioning, many automation devices 200 may not require additional configuration by skilled professionals.

Although the invention(s) is/are described herein with reference to specific embodiments, various modifications and changes can be made without departing from the scope of the present invention(s), as set forth in the claims below. For example, although presented in the context of automation devices, various systems and methods described herein may be implemented in other types of electronic devices. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
   receiving a first message at a provisioning server, the first message originated by a computing device, the first message including a device identifier associated with an automation device;
   receiving a second message at the provisioning server, the second message originated by the automation device and including at least a device identifier portion; and
   in response to the device identifier portion of the second message matching the device identifier of the first message, and in response to the automation device not being associated with a provisioning account, providing configuration information to the automation device;
   wherein the provisioning server has access to a database configured to store a plurality of device identifiers and corresponding private-public key pairs, each device identifier and corresponding private-public key pair associated with a given automation device, wherein the device identifier portion of the second message is encrypted using a public key, the public key stored in the automation device during manufacturing of the automation device, the method further comprising:
   decrypting at least the device identifier portion of the second message into a decrypted device identifier using a private key corresponding to the public key; and
   in response to the decrypted device identifier matching the device identifier of the first message, transmitting the private key to the automation device by the provisioning server, the automation device configured to use the private key in a subsequent communication.

2. The method of claim 1, wherein the automation device includes at least one of: a lighting control device, a thermostat device, a shading device, a security device, an appliance, or an entertainment device, and wherein the computing device includes at least one of: a mobile phone, a tablet computer, a laptop computer, or a desktop computer.

3. The method of claim 1, wherein the first message is originated in response to the computing device having received the device identifier via at least one of: a text entry, a bar code, a two-dimensional code, a Quick Response (QR) code, a Radio Frequency Identification (RFID) tag, a Near Field Communication (NFC) chip, or a Personal Area Network (PAN) communication.

4. The method of claim 1, wherein the first message is received at the provisioning server while the automation device is powered off, and wherein the second message is received at the provisioning server after the first message has been received.

5. The method of claim 1, wherein providing the configuration information includes providing the configuration in response to a difference between a time of the second message and a time of the first message being within a threshold value.

6. The method of claim 1, wherein providing the configuration information includes providing the configuration in response to a network part of an Internet Protocol (IP) address of the second message matching a network part of an IP address of the first message.

7. The method of claim 1, providing the configuration information includes providing the configuration in response to the physical location of the computing device being within a predefined geographical region where the automation device is allowed to be deployed.

8. The method of claim 1, wherein the first message is encrypted by the computing device independently of the public key, the method further comprising decrypting the first message by the provisioning server to obtain the device identifier.

9. An automation device, comprising:
a memory configured to store a device identifier and a public key; and
a processing circuit coupled to the memory, the processing circuit configured to execute instructions to cause the automation device to:
transmit a first communication to a remotely located provisioning service, the request including the device identifier encrypted using the public key, the first communication transmitted after a message originated by a computing device is received by the provisioning service, the message including the device identifier, the provisioning service having access to a database configured to store a plurality of device identifiers and corresponding private-public key pairs, each device identifier and corresponding private-public key pair associated with an automation device; and
receive a second communication from the provisioning service, the second communication including a private key corresponding to the public key, the private key identified by the provisioning service among the plurality of private-public key pairs based upon one or more attempts to decrypt the first communication using other private keys, the second communication received in response to the encrypted device identifier of the first communication matching the device identifier of the message.

10. The automation device of claim 9, the message received by the provisioning server while the automation device is powered off, and wherein the message is encrypted independently of the public key.

11. The automation device of claim 9, the private key identified by the provisioning service among a subset of the plurality of private-public key pairs, the subset of the plurality of private-public key pairs selected based upon a difference between a time of the first communication and a time of the message.

12. The automation device of claim 9, the private key identified by the provisioning service among a subset of the plurality of private-public key pairs, the subset of the plurality of private-public key pairs selected based upon a relationship between an Internet Protocol (IP) address of the first communication and an IP address of the message.

13. The automation device of claim 9, the second communication received in response to a determination that the IP address of the computing device is not within a network where the automation device is prohibited from being deployed.

14. The automation device of claim 9, the second communication received in response to a determination that the physical location of the computing device is not outside of geographical region where the automation device is prohibited from being deployed.

15. A non-transitory computer-readable storage medium having program instructions stored thereon that, upon execution by a processor within a computing device, cause the computing device to:
obtain a device identifier associated with an automation device; and
transmit a first message from the computing device to a provisioning server, the first message including the device identifier, the provisioning server having access to a database configured to store a plurality of device identifiers and corresponding private-public key pairs, each device identifier and corresponding private-public key pair associated with a different automation device, the provisioning server configured to receive a second message at the provisioning server originated by the automation device, the second message including at least the device identifier encrypted using a public key, the public key stored in the automation device during manufacturing of the automation device, the provisioning service configured to decrypt the device identifier of the second message into a decrypted device identifier using a private key corresponding to the public key, the provisioning service configured to, in response to the decrypted device identifier matching the device identifier of the first message, transmit the private key to the automation device, the automation device configured to use the private key in a subsequent communication.

16. The non-transitory computer-readable storage medium of claim 15, wherein to obtain the device identifier, the program instructions, upon execution, cause the computing device to perform at least one of: (a) scan a graphical code or text associated with the automation device, or (b) read an electromagnetic signal produced by a tag or chip associated with the automation device.

17. The non-transitory computer-readable storage medium of claim 15, wherein to obtain the device identifier, the program instructions, upon execution, cause the computing device to obtain authentication information from a user authorized to provision the automation device.

18. The non-transitory computer-readable storage medium of claim 15, wherein the program instructions, upon execution, cause the computing device to include an Internet Protocol (IP) address of the computing device within the first message, the provisioning service configured to transmit the private key to the automation device in response to the IP address belonging to a network where the automation device is allowed to be deployed.

19. The non-transitory computer-readable storage medium of claim 15, wherein the program instructions, upon execution, cause the computing device to include Global Positioning Satellite (GPS) coordinates of the computing device within the first message, the provisioning service configured to transmit the private key to the automation device in response to the GPS coordinates being within a geographic region where the automation device is allowed to be deployed.

\* \* \* \* \*